(12) United States Patent
Watanabe et al.

(10) Patent No.: US 7,952,060 B2
(45) Date of Patent: May 31, 2011

(54) PIXEL CIRCUIT HAVING FLIP-FLOP WITH INVERTER AND FEEDBACK TRANSISTOR, ELECTRO-OPTICAL DEVICE HAVING SAID PIXEL CIRCUIT, AND ELECTRONIC APPARATUS HAVING SAID ELECTRO-OPTICAL DEVICE

(75) Inventors: Kenya Watanabe, Suwa (JP); Ryo Ishii, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 194 days.

(21) Appl. No.: 12/391,303

(22) Filed: Feb. 24, 2009

(65) Prior Publication Data
US 2009/0212200 A1   Aug. 27, 2009

(30) Foreign Application Priority Data
Feb. 25, 2008 (JP) ................................. 2008-043133

(51) Int. Cl.
    *H01L 27/00* (2006.01)
(52) U.S. Cl. .................................. 250/208.1; 250/214 R
(58) Field of Classification Search ............... 250/208.1, 250/214 R, 214.1; 257/290–292, 440; 348/292–311
See application file for complete search history.

(56) References Cited

U.S. PATENT DOCUMENTS
5,164,612 A * 11/1992 Kaplinsky .................... 327/108

FOREIGN PATENT DOCUMENTS
| JP | 05-224235 A | 9/1993 |
| JP | 2003-114661 A | 4/2003 |
| JP | 2005-258007 A | 9/2005 |

* cited by examiner

*Primary Examiner* — Que T Le
(74) *Attorney, Agent, or Firm* — Lowe, Hauptman, Ham & Berner, LLP

(57) ABSTRACT

A pixel circuit includes a pixel electrode, a pixel transistor of a first conduction type, and a flip-flop. The pixel transistor has a control node connected to a scanning line, a first node connected to a data line, and a second node. The flip-flop has an inverter and a feedback transistor of a second conduction type opposite to the first conduction type. The inverter has an input node connected to the second node of the pixel transistor, and an output node connected to the pixel electrode. The feedback transistor is controlled to be turned on or off in accordance with an output of the inverter for supplying a high-level power source voltage or a low-level power source voltage to a common connection point of the second node of the pixel transistor and the input node of the inverter, in the ON state.

13 Claims, 13 Drawing Sheets

PIXEL CIRCUIT HAVING FLIP-FLOP WITH INVERTER AND FEEDBACK TRANSISTOR, ELECTRO-OPTICAL DEVICE HAVING SAID PIXEL CIRCUIT, AND ELECTRONIC APPARATUS HAVING SAID ELECTRO-OPTICAL DEVICE

RELATED APPLICATIONS

The present application is based on, and claims priority from, Japanese Application Number 2008-043133, filed Feb. 25, 2008, the disclosure of which is hereby incorporated by reference herein in its entirety.

BACKGROUND

1. Technical Field

The present invention relates to a pixel circuit, an electro-optical device of a digital driving type (for example, a liquid crystal display device employing a subfield driving type), and an electronic apparatus.

2. Related Art

For example, as a driving method for a liquid crystal display device, there are an analog driving type (a method in which an analog voltage corresponding to a display gray scale is applied to a data line) and a digital driving type (a driving method in which there are only two values including an ON level and an OFF level as voltage levels needed for driving a pixel). In the analog driving type, non-uniformity of display can be easily generated due to the non-uniformity of characteristics of elements (a D/A converter, an operational amplifier, a wiring, and the like) configuring the circuit. On the other hand, in the digital driving type, used driving voltages (writing voltages for a pixel) are binary, and accordingly, it is easy to implement image display having higher definition.

As the digital driving type, a subfield driving type in which one field is divided into a plurality of subfields on a time axis and an ON voltage or an OFF voltage is applied to each subfield in accordance with the gray scale of each pixel has been proposed (for example, see JP-A-2003-114661). In this subfield driving type, a voltage (effective voltage) supplied to a liquid crystal is changed by controlling not a voltage level but an application time interval of a voltage pulse, and thereby the transmissivity of the liquid crystal is controlled.

As a pixel circuit that can be used in the liquid crystal display device of the digital driving type, for example, there are a DRAM-type pixel circuit (a general pixel circuit having a pixel transistor and a holding capacitor) and a pixel circuit (a RAM-type pixel circuit) that has a RAM (a memory circuit that maintains "1" or "0" by using positive feedback) instead of the holding capacitor.

The DRAM-type pixel circuit has an advantage that the circuit configuration thereof is simple. However, in the DRAM-type pixel circuit, a change (for example, see JP-A-5-224235) in the maintained voltage caused by feed-through or a change in the maintained voltage caused by a leak current can easily occur. Accordingly, for performing high-definition display, there is limit in the DRAM-type pixel circuit.

In addition, as the RAM-type pixel circuit, for example, a pixel circuit that uses an SRAM has been proposed (see JP-A-2005-258007). When the pixel circuit disclosed in JP-A-2005-258007 is used, high-definition image display can be performed. However, in such a case, the circuit configuration is complicated. Accordingly, an increase in the size of the pixel circuit and an increase in the power consumption of the pixel circuit are inevitable.

In the liquid crystal display device of the digital driving type, when a RAM-type pixel circuit is used, the circuit configuration is complicated, and thereby an increase in the size of the pixel circuit and an increase in the power consumption of the pixel circuit occur. Accordingly, it is difficult to implement high-definition image display while miniaturization and low power consumption of the liquid crystal display device are achieved.

SUMMARY

An advantage of some aspects of the invention is that it provides a highly reliable pixel circuit, which is appropriate for a digital driving type, having a small number of elements, occupying a small area, and capable of writing data with high accuracy and maintaining the written voltage.

According to a first aspect of the invention, there is provided a pixel circuit that is disposed in correspondence with an intersection of a scanning line and a data line. The pixel circuit includes: a pixel electrode; a pixel transistor of a first conduction type that has a control node connected to the scanning line, a first node to which the data line is connected, and a second node; and a flip-flop that is disposed between the second node of the pixel transistor and the pixel electrode. The flip-flop has an inverter having an input node connected to the second node of the pixel transistor and an output node connected to the pixel electrode and a feedback transistor of a second conduction type, which is a conduction type opposite to the first conduction type, that is controlled to be turned on or off in accordance with an output of the inverter and supplies a high-level power source voltage or a low-level power source voltage to a common connection point of the second node of the pixel transistor and the input node of the inverter, in the ON state.

The above-described pixel circuit, for example, may be configured by a total of four MOS transistors including one MOS transistor that configures the pixel transistor, two MOS transistors that configure the CMOS inverter, and one MOS transistor that configures the feedback transistor. In other words, a compact pixel circuit having a simplified configuration that is configured by four elements can be implemented.

In addition, by the positive feedback reaction of the flip-flop that is configured by the inverter and the feedback transistor, the voltage of the holding node (that is, a common connection point of the second node of the pixel transistor and the input node of the inverter) is stably maintained at a voltage corresponding to written data of "1" or "0", that is, the high-level power source electric potential (VDD) or the low-level power source voltage (GND). Accordingly, writing data and maintaining the written data can be performed assuredly. In other words, for example, when the pixel transistor is an NMOS transistor (PMOS transistor), the feedback transistor is a PMOS transistor (NMOS transistor) having the opposite conduction type. When the feedback transistor is the PMOS transistor, the high-level power source voltage VDD (in a general term, a voltage corresponding to data "1") is applied to the source (second node). On the other hand, when the feedback transistor is the NMOS transistor, the low-level power source voltage GND (in a general term, a voltage corresponding to data "0") is applied to the source (second node). Under this configuration, VDD or GND that is applied to the source (second node) is directly (without any voltage drop of a threshold voltage (Vth)) applied to the drain (first node) of the feedback transistor. Accordingly, the voltage of the holding node is precisely maintained at a voltage level (VDD or GND) corresponding to data "1" or data "0" all the time. For example, when the source and the gate of the feedback transistor have a same electric potential, the configuration of a MOS diode is formed, and accordingly, the voltage of the drain decreases by the threshold value (vth) of the feedback transistor. However, according to the above-described pixel circuit, when the feedback transistor (for example, the PMOS transistor) in the ON state, the high-level power source voltage (VDD) is applied to the source, and the ground electric potential (GND) is applied to the gate. Accordingly, the feedback transistor is not formed as the configuration of the MOS diode. As a result, VDD (high-level power source voltage) is directly (without any voltage drop by Vth) applied to the drain (that is, the common connection point of the second node of the pixel transistor and the input node of the inverter). Thus, for example, even when the voltage of the holding node changes momentarily in accordance with the occurrence of feed-through (push-down or push-up) due to parasitic capacitance between the source and drain of the pixel transistor, the change is momentarily absorbed by the positive feedback reaction of the flip-flop, and, as described above, the voltage of the holding node is precisely maintained at a voltage level (VDD or GND) corresponding to data "1" or data "0" all the time. As a result, a pixel circuit that is miniaturized and has low power consumption and high reliability can be implemented.

According to a second aspect of the invention, in the above-described pixel circuit, the pixel transistor is an MOS transistor of the first conduction type, and the inverter is a CMOS inverter that operates between the high-level power source voltage and the low-level power source voltage. In addition, the feedback transistor is an MOS transistor of the second conduction type that has a control node, a first node, and a second node, and the control node of the feedback transistor is connected to a common connection point of an output node of the CMOS inverter and the pixel electrode. In addition, the high-level power source voltage or the low-level power source voltage is applied to the first node of the feedback transistor, and the second node of the feedback transistor is connected to a common connection point of the second node of the pixel transistor and an input node of the CMOS inverter.

According to the second aspect, for example, by using a minimum number of MOS transistors (four MOS transistors), a pixel circuit that is miniaturized and has low power consumption and high reliability can be implemented.

According to a third aspect of the invention, the above-described pixel circuit further includes a resistor or a MOS transistor of a normally-off state that is connected between the common connection point of the second node of the pixel transistor and the input node of the inverter and a high-level power source electric potential node or a low-level power source electric potential node.

In the above-described pixel circuit, it is considered that the voltage of the holding node may change due to an off-leak current that flows in the case of the OFF state of the feedback transistor, and a countermeasure is taken in this point. In other words, when the feedback transistor is in the OFF state (for example, in a case where the feedback transistor is the PMOS transistor, in a state in which a voltage (=GND) corresponding to data "0" is maintained at the holding node), a case where the voltage of the holding node slowly rises with elapse of a long time due to the off-leak current (a leak current in the OFF state) of the feedback transistor may be considered. When the voltage of the holding node exceeds the threshold voltage of the inverter, the level of the output voltage of the inverter is inverted. Accordingly, in such a case, the electric potential of the holding node is inverted, and incorrect data is maintained. However, generally, a pixel circuit of a display device may be periodically (regularly) rewritten for a predetermined period, and thus, a state in which the pixel circuit is not selected for a long time, and the voltage of the holding node markedly changes due to the off-leak current of the feedback transistor during the time cannot occur easily. However, when the countermeasure is taken for the off-leak current, the reliability of the pixel circuit is improved further. From this viewpoint, in the above-described pixel circuit, a leak path for absorbing (passing) the off-leak current of the feedback transistor is provided. The leak path may be formed by a resistor (for example, a thin-film high-value resistor) or a MOS transistor of the normally off state. In the above-described pixel circuit, since the countermeasure is taken for the off-leak current of the feedback transistor, the reliability of the pixel circuit is improved further.

According to a fourth aspect of the invention, in the above-described pixel circuit, the MOS transistor of the normally-off state is an MOS transistor of the second conduction type that has a control node connected to the high-level power source electric potential node, a first node connected to the high-level power source electric potential node or the low-level power source electric potential node, and a second node connected to the common connection point of the second node of the pixel transistor and the input node of the inverter.

Under the circuit configuration of the above-described pixel circuit, the leak path is configured by an MOS transistor (this MOS transistor is referred to as a leak path transistor) having the same conduction type (that is, the second conduction type) as that of the feedback transistor. In the case, the temperature coefficients of the off-leak currents of the feedback transistor and the leak-path transistor become the same. Thus, when the current amount of the off-leak current of one side increases or decreases, the current amount of the off-leak current of the other side increases or decreases in the same manner. Accordingly, even when access to the pixel circuit is not made for a long time, the voltage of the holding node is stably maintained over a broad temperature range. As a result, a pixel circuit having high reliability is implemented.

According to a fifth aspect of the invention, in the above-described pixel circuit, the current amount of a leak current at a time when the feedback transistor is turned off is set to be smaller than the current amount of a sum of a leak current at a time when the pixel transistor is turned off and a leak current of the resistor or the MOS transistor of the normally-off state.

In order to set the countermeasure for the off-leak current of the feedback transistor thoroughly, in the above-described pixel circuit, the current amount of the off-leak current of the feedback transistor is set to be smaller than a sum of the off-leak current of the pixel transistor and the leak current of the resistor or the MOS transistor (leak path transistor) in the normally-off state. Accordingly, the leak current of the feedback transistor is absorbed by the power source electric potential (or the electric potential of the data line) assuredly, and the voltage of the holding node does not change in accordance with the off-leak current of the feedback transistor.

According to a sixth aspect of the invention, in the above-described pixel circuit, when the MOS transistor of the first conduction type that configures the pixel transistor is an NMOS transistor, the current supplying capability of the NMOS transistor that configures the CMOS inverter is set to be larger than that of the PMOS transistor that configures the CMOS inverter, and when the MOS transistor of the first conduction type that configures the pixel transistor is a PMOS transistor, the current supplying capability of the PMOS transistor that configures the CMOS inverter is set to be larger than that of the NMOS transistor that configures the CMOS inverter.

As described above, in the above-described pixel circuit, even when the voltage of the holding node changes momentarily in accordance with the occurrence of feed-through (push-down or push-up) due to parasitic capacitance between the source and drain of the pixel transistor, the change is momentarily absorbed by the positive feedback reaction of the flip-flop in a case where the flip-flop operates normally, and the voltage of the holding node is precisely maintained at a voltage level (VDD or GND) corresponding to data "1" or data "0" all the time. However, for example, in a case where the voltage of the holding node changes quite markedly due to the feed-through, when the output voltage of the inverter is inverted incorrectly, miss-latch of data (data is written incorrectly) occurs. Accordingly, in the above-described pixel circuit, for preventing easy inversion of the output level of the inverter even for a case where the voltage of the holding node slightly changes, the current supplying capability of the transistors configuring the inverter is set to be different from each other, and the threshold voltage of the inverter is shifted from the center voltage (for example, VDD/2) to the low-level side (in a case where the pixel transistor is the NMOS transistor) or the high-level side (in a case where the pixel transistor is the PMOS transistor). Accordingly, the possibility that the output of the inverter is incorrectly inverted can be decreased. As a result, the reliability of the pixel circuit is improved further.

According to a seventh aspect of the invention, in the above-described pixel circuit, an ON current of the pixel transistor is set to be larger than that of the feedback transistor.

In the above-described pixel circuit, for example, when data "0" (=GND) is written in a state in which data "1" (=VDD) is maintained at the holding node of the pixel circuit, in order to perform a writing operation assuredly, the characteristics (design values such as the sizes) of the pixel transistor and the feedback transistor are optimized. In other words, the on-current of the pixel transistor is set to be higher than the on-current of the feedback transistor. Accordingly, even when the positive feedback reaction is performed by the flip-flop, electric charges at the holding node of the H level are discharged to the data line of the L level in a speedy manner. Accordingly, the electric potential of the holding node transits from H to L in a speedy manner. Thus, a case where "0" cannot be written into the holding node that maintains "1" does not occur.

According to an eighth aspect of the invention, the above-described pixel circuit further includes a power source voltage supplying transistor of the second conduction type that supplies the high-level power source voltage or the low-level power source voltage to the feedback transistor. In addition, a control node of the power source voltage supplying transistor is connected to the scanning line, and a first node of the power source voltage supplying transistor is connected to a high-level power source electric potential node or a low-level power source electric potential node, and the high-level power source voltage or the low-level power source voltage is supplied from a second node of the power source voltage supplying transistor to the feedback transistor in a case where the power source voltage supplying transistor is in the ON state.

In the above-described pixel circuit, in a case where the electric potential of the holding node transits from H to L, right after the scanning line has the selection level, a current momentarily flows from the power source line toward the data line having the L level through the turned-on feedback transistor. This current becomes a factor for changing the electric potential of the data line and may have influence on the maintained voltages of the other pixel circuits or the like. Accordingly, in the above-described pixel circuit, when the positive feedback reaction of the flip-flop is performed, even in a case where the electric potential of the holding node transits from H to L, a large current does not flow in the data line through the feedback transistor. In other words, the power source voltage is supplied to the feedback transistor from the power source voltage supplying transistor. Under this configuration, when the scanning line has the selection level so as to turn on the pixel transistor of the first conduction type, the power source voltage supplying transistor of the second conduction type is turned off. Accordingly, the power source voltage is not supplied to the feedback transistor, and therefore a large current does not flow toward the data line through the feedback transistor. As a result, the stability of the circuit is improved.

According to a ninth aspect of the invention, in the above-described pixel circuit, a capacitor is connected between the input and output nodes of the inverter.

Accordingly, a pixel circuit that has strength for minute noises such as coupling noises can be acquired.

According to a tenth aspect of the invention, in the above-described pixel circuit, the power source voltage supplying transistor is commonly used by a plurality of adjacent pixel circuits.

In the above-described pixel circuit, the power source voltage supplying transistor is commonly used, and accordingly, the layout area can be decreased.

According to an eleventh aspect of the invention, there is provided an electro-optical device of a digital driving type having the above-described pixel circuit.

The above-described pixel circuit is a new highly reliable pixel circuit, which is appropriate for a digital driving type, having a minimum number of elements and capable of performing high-definition image display. Accordingly, by using the pixel circuit, an electro-optical device of a digital driving type that is miniaturized and light-weighted, has low power consumption, and is capable of performing high-definition display is implemented.

According to a twelfth aspect of the invention, there is provided an electronic apparatus in which the above-described electro-optical device is mounted.

Accordingly, for example, the display quality of a small-size electronic apparatus can be improved.

As described above, according to some aspects of the invention, for example, a pixel circuit that has a small number of elements, occupies a small area, can write data with high accuracy and maintain the written voltage, has high reliability, and is appropriate for a digital driving type can be implemented.

BRIEF DESCRIPTION OF THE DRAWINGS

The invention will be described with reference to the accompanying drawings, wherein like numbers reference like elements.

DESCRIPTION OF EXEMPLARY EMBODIMENTS

Next, embodiments of the invention will be described with reference to the accompanying drawings. The embodiments described below are not for purposes of unnecessarily limiting the scope of the invention that is defined by the claims. In addition, it cannot be determined that all the constituent elements described in the embodiments are essential as solving means of the invention.

In descriptions below, for a transistor, terms of a control node, a first node, and a second node may be used. In addition, for an inverter, terms of an input node and an output node may be used. The meanings of these terms, for example, are as shown in FIGS. 13A and 13B.

Figure 13A:
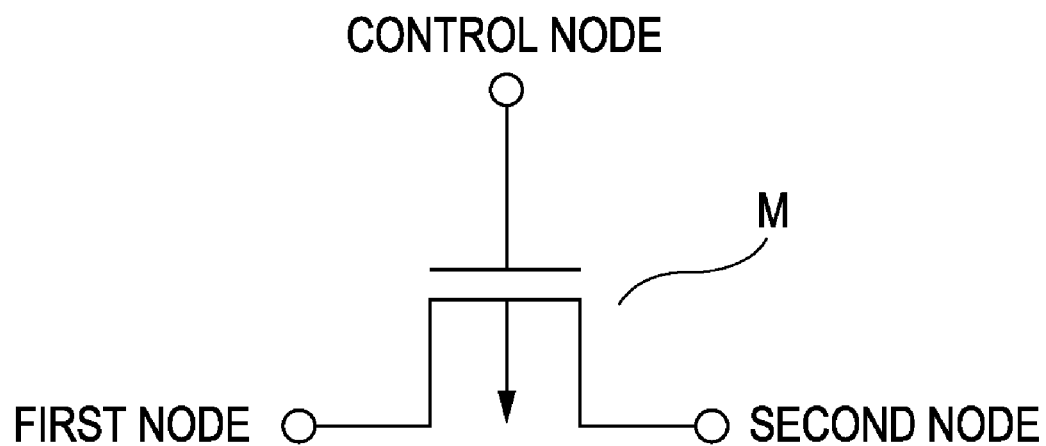
FIGS. 13A and 13B are diagrams for describing an example of meanings of terms.

In other words, as shown in FIG. 13A, for a MOS transistor M, the gate is the control node, and, for example, the source is the first node, and the drain is the second node. In addition, for a bipolar transistor, the base is the control node, the emitter is the first node, and the collector is the second node.

Figure 13B:
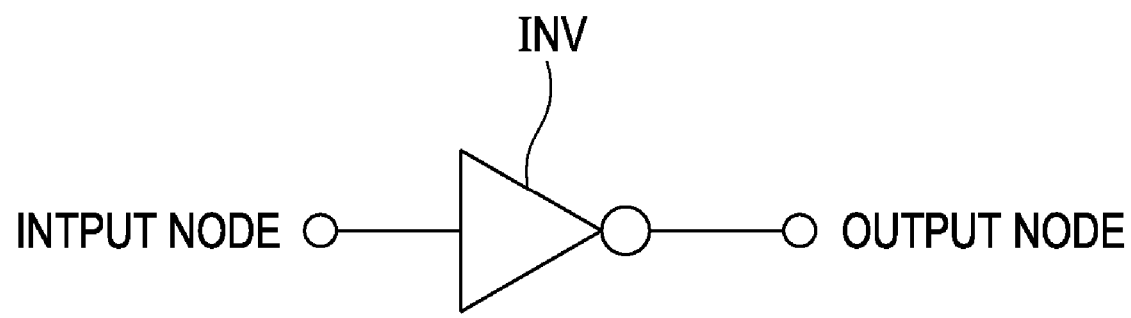

In addition, as shown in FIG. 13B, a node for inputting a signal to an inverter is the input node, and a node for outputting an output signal of an inverter is the output node.

In descriptions below, similarly, terms of a power-source electric potential node and a power-source supplying node may be used. These terms mean an electric potential point that is maintained at a power-source electric potential (VDD, GND, or the like) and a voltage point for supplying a power source voltage.

First Embodiment

Figure 1:
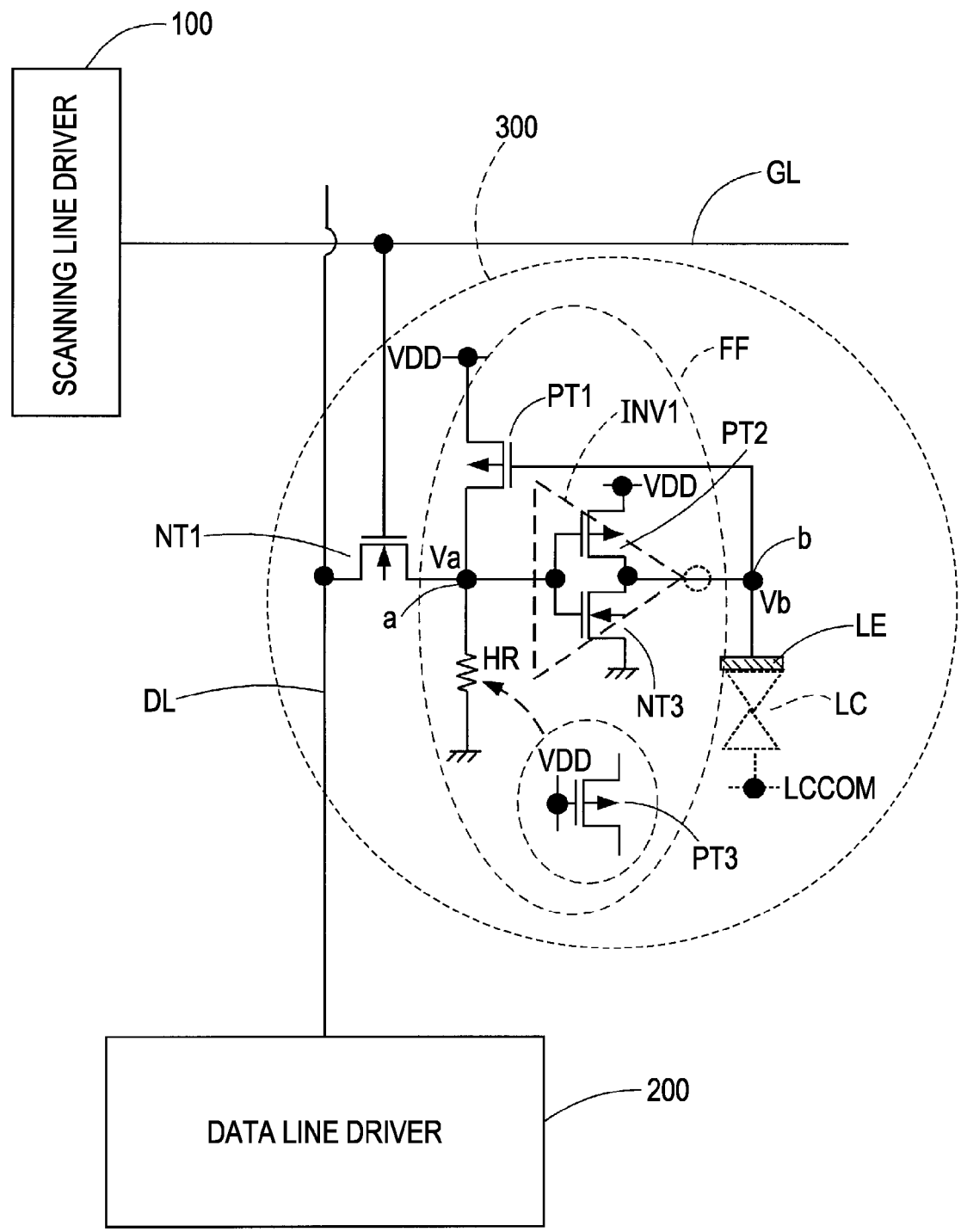
FIG. 1 is a circuit diagram showing an example of the configuration of a pixel circuit according to an embodiment of the invention.

FIG. 1 is a circuit diagram showing an example of the configuration of a pixel circuit according to an embodiment of the invention. As shown in the figure, the pixel circuit 300 is disposed in correspondence with an intersection of a scanning line GL and a data line DL. The scanning line GL is driven by a scanning line driver 100, and the data line DL is driven by a data line driver 200.

The pixel circuit 300, for example, includes a pixel transistor NT1 that is formed by an NMOS transistor (n-channel insulated gate-type field effect transistor regardless of the type of an insulation film), a flip-flop FF, and a pixel electrode LE (electrode for applying a voltage to a liquid crystal LC).

The flip-flop FF includes a CMOS inverter INV1 that operates between the high-level power source voltage VDD and the low-level power source voltage GND and a feedback transistor PT1 that is formed of a PMOS transistor. The CMOS inverter INV1 and the feedback transistor PT1 form a positive feedback loop.

The feedback transistor PT1 has the source to which VDD (the high-level power source voltage) is applied, the drain connected to a common connection point (point a) of the drain of the pixel transistor and the input node of the CMOS inverter INV1, and the gate connected to the output node of the CMOS inverter INV1. When the feedback transistor PT1 is in the ON state, the high-level power source voltage VDD is supplied to a holding node (point a). The voltage of the holding node (point a) is Va. In addition, the voltage of the inverted node (point b) is Vb. The voltage Vb of the inverted node (point b) is applied to a pixel electrode LE. In addition, in the liquid crystal display device, to the pixel electrode (opposing electrode) of the liquid crystal LC on the other side, for example, a common voltage LCCOM is applied.

The pixel circuit shown in FIG. 1 may be configured by a total of four MOS transistors including the pixel transistor NT1, two MOS transistors PT2 and NT3 that configure the CMOS inverter INV1, and the feedback transistor PT1. In other words, a compact pixel circuit having a simplified configuration that is configured by four elements is implemented.

In addition, by the positive feedback reaction of the flip-flop FF that is configured by the inverter INV1 and the feedback transistor PT1, the voltage of the holding node (that is, point "a" that is a common connection point of the second node of the pixel transistor and the input node of the inverter) is stably maintained at a voltage corresponding to written data of "1" or "0", that is, the high-level power source electric potential VDD or the low-level power source voltage GND. Accordingly, writing data and maintaining the written data can be performed assuredly.

In other words, in the pixel circuit shown in FIG. 1, the pixel transistor NT1 is configured by an NMOS transistor, and the feedback transistor is configured by a PMOS transistor having the opposite conduction type. The pixel transistor NT1 is configured by an NMOS transistor, and the feedback transistor is configured by a PMOS transistor having the opposite conduction type. Alternatively, it may be configured that the pixel transistor is configured by a PMOS transistor, and the feedback transistor is configured by an NMOS transistor having the opposite conduction type (see FIG. 7).

As in FIG. 1, when the feedback transistor PT1 is the PMOS transistor, the high-level power source voltage VDD (in a general term, a voltage corresponding to data "1") is applied to the source (second node). On the other hand, when the feedback transistor is the NMOS transistor (in the case of FIG. 7), the low-level power source voltage GND (in a general term, a voltage corresponding to data "0") is applied to the source (second node). Under this configuration, VDD or GND that is applied to the source (second node) is directly (without any voltage drop of a threshold voltage (Vth)) applied to the drain (first node) of the feedback transistor. Accordingly, the voltage of the holding node (point a) is precisely maintained at a voltage level (VDD or GND) corresponding to data "1" or data "0" all the time. For example, when the source and the gate of the feedback transistor have a same electric potential, the configuration of a MOS diode is formed, and accordingly, the voltage of the drain decreases by the threshold value (vth) of the feedback transistor. However, under the configuration shown in FIG. 1, when the feedback transistor (PMOS transistor PT1) in the ON state, the high-level power source voltage (VDD) is applied to the source, and the ground electric potential (GND) is applied to the gate. Accordingly, in such a case, the feedback transistor PT1 is not formed as the configuration of the MOS diode. As a result, VDD (high-level power source voltage) is directly (without any voltage drop by Vth) applied to the drain (that is, point "a" that is the common connection point of the second node of the pixel transistor and the input node of the inverter) (Va=VDD).

Thus, for example, even when the voltage of the holding node changes momentarily in accordance with the occurrence of feed-through (push-down or push-up) due to parasitic capacitance between the source and drain of the pixel transistor NT1 shown in FIG. 1, the change is momentarily absorbed by the positive feedback reaction of the flip-flop, and, as described above, the voltage of the holding node is precisely maintained at a voltage level (VDD or GND) corresponding to data "1" or data "0" all the time. As a result, a pixel circuit that is miniaturized and has low power consumption and high reliability can be implemented.

In addition, in the pixel circuit shown in FIG. 1, a high-value resistor HR is disposed between the holding node (point a) and the ground electric potential (low-level power source voltage). This high-value resistor HR is not an essential element of a pixel circuit in which each pixel is periodically accessed. However, by disposing the high-value resistor HR, the reliability of the pixel circuit increases further.

In other words, the high resistance HR serves to stabilize the electric potential of the holding node (point a) in a case where the feedback transistor PT1 is in the OFF state. In other words, by having an off-leak current of the feedback transistor PT1 to flow to the ground electric potential, the electric potential Va of the holding node (point a) increases due to the leak current, and accordingly, the high-value resistor HR serves to prevent inverting the output level of the CMOS inverter INV1 incorrectly.

For example, when the feedback transistor PT1 is in the OFF state (in the case of FIG. 1, in a state in which a voltage level (=GND) corresponding to data "0" is maintained at the holding node (point a)), a case where the voltage of the holding node (point a) slowly rises with elapse of a long time due to the off-leak current (a leak current in the OFF state) of the feedback transistor PT1 may be considered. When the voltage of the holding node (point a) exceeds the threshold voltage of the inverter, the level of the output voltage of the inverter INV1 is inverted. Accordingly, in such a case, the electric potential of the holding node (point a) is inverted, and incorrect data is maintained. However, generally, a pixel circuit of a display device may be periodically (regularly) rewritten for a predetermined period, and thus, a state in which the pixel circuit is not selected for a long time, and the voltage of the holding node markedly changes due to the off-leak current of the feedback transistor during the time cannot occur easily. However, when a countermeasure is taken for the off-leak current of the feedback transistor, the reliability of the pixel circuit is improved further.

From this viewpoint, in the pixel circuit shown in FIG. 1, a leak path for absorbing (passing) the off-leak current of the feedback transistor PT1 is formed by the high-value resistor HR. The high-value resistor HR, for example, is a resistor formed of thin-film poly silicon. The high-value resistor HR can be laminated on the pixel transistor NT1, for example, by using multilayer wiring technology, and thus, it contributes to suppression of an increase of the area occupied by the pixel circuit.

In addition, as denoted by surrounding with a circle of a dotted line, the high-value resistor HR, for example, may be replaced with a PMOS transistor (leak path transistor) PT3 of a normally-off type that has the gate connected to VDD. In such a case, there is an advantage that temperature coefficients of the off-leak currents of the feedback transistor PT1 and the leak path transistor PT3 are matched (this will be described later).

Figure 2A:
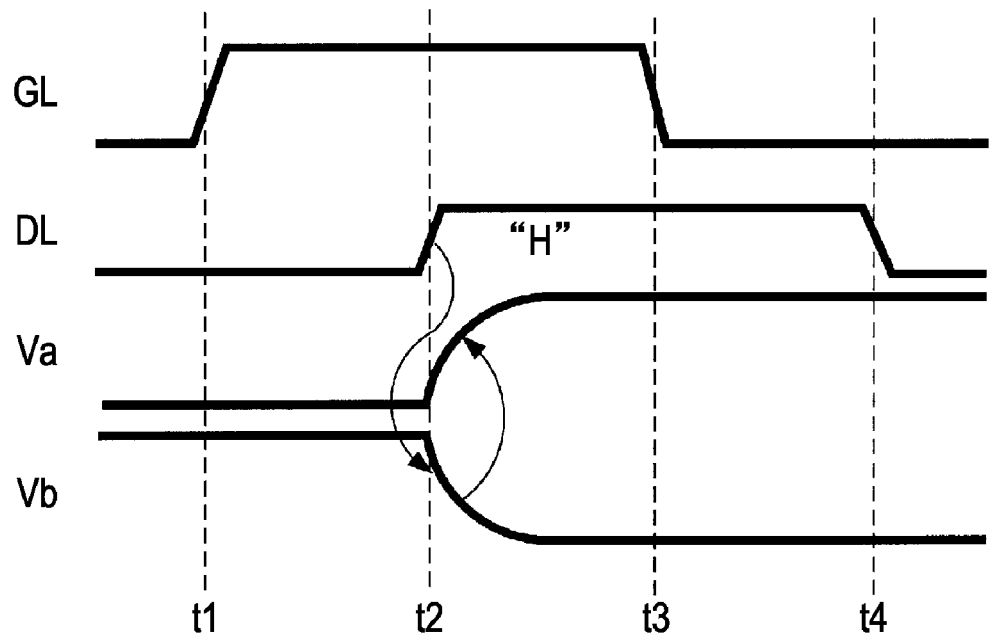
FIGS. 2A and 2B are diagrams showing the operations for cases where voltages corresponding to "1" and "0" are written into the pixel circuit shown in FIG. 1.
Figure 2B:
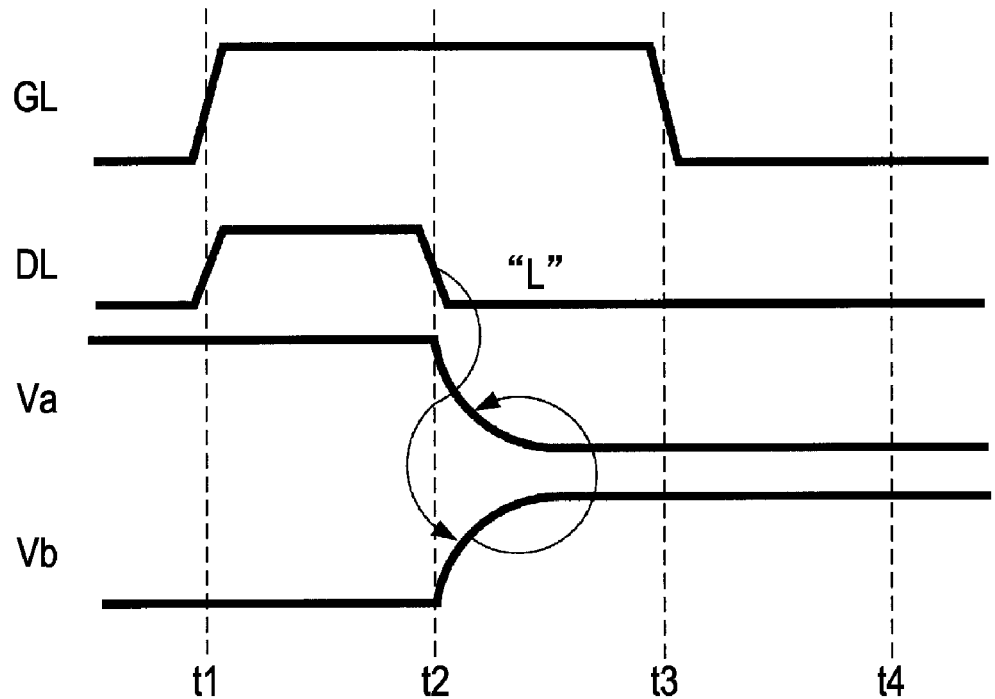

FIGS. 2A and 2B are waveform diagrams showing the operations for cases where voltages corresponding to "1" and "0" are written into the pixel circuit shown in FIG. 1.

FIG. 2A shows the operation for a case where a voltage corresponding to "1" is written. FIG. 2B shows the operation for a case where a voltage corresponding to "0" is written. As shown in FIG. 2A, at time t1, the electric potential of the scanning line GL rises, and the electric potential of the data line changes from L to H at time t2. Then, the level of the output voltage of the inverter INV1 is inverted, and voltage Vb of the inverted node (point b) transits from H to L in a speedy manner. In accordance with this transition, the feedback transistor PT1 is turned on, and the electric potential of the holding node (point a) transits from L to H. As described above, the H level of point "a" rises to VDD (the level corresponding to data "1") by the positive feedback reaction of the flip-flop FF even in a case where there is an influence from the feed-through or the like.

In addition, as shown in FIG. 2B, the electric potential of the scanning line GL rises at time t1, and the electric potential of the data line changes from H to L at time t2. Then, the level of the output voltage of the inverter INV1 is inverted, and voltage Vb of the inverted node (point b) transmits from L to H in a speedy manner. In accordance with this transition, the feedback transistor PT1 is turned off, and the electric potential of the holding node (point a) transits from H to L. In other words, point "a" has the ground electric potential.

Figure 3A:
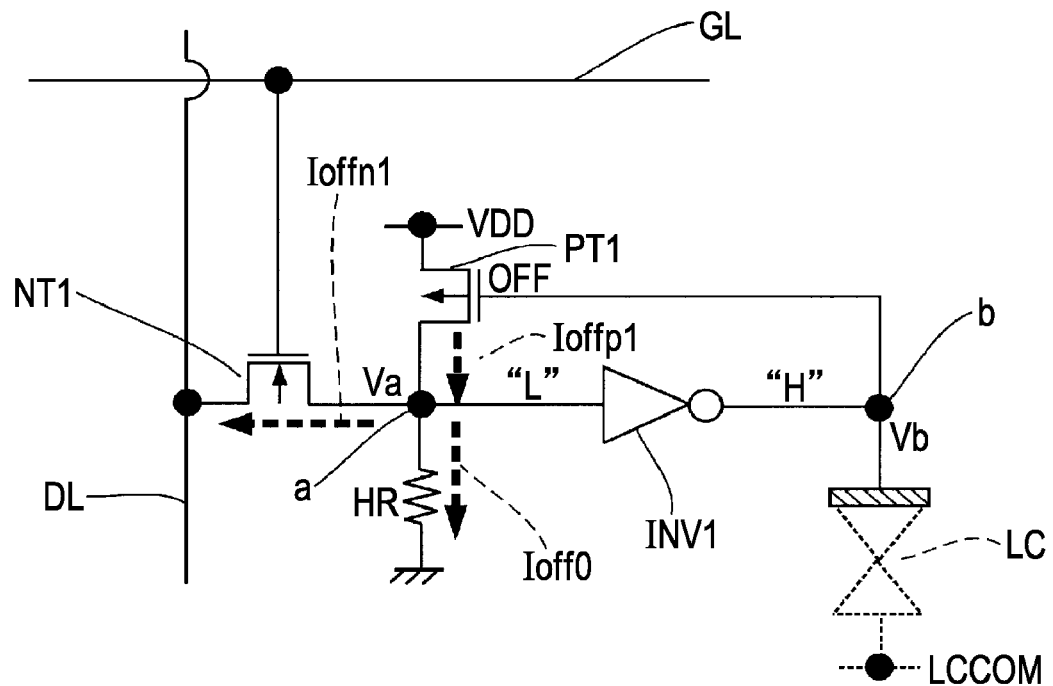
FIGS. 3A and 3B are diagrams for describing a countermeasure for preventing an operational error of an inverter due to an off-leak current of a feedback transistor according to an embodiment of the invention.
Figure 3B:
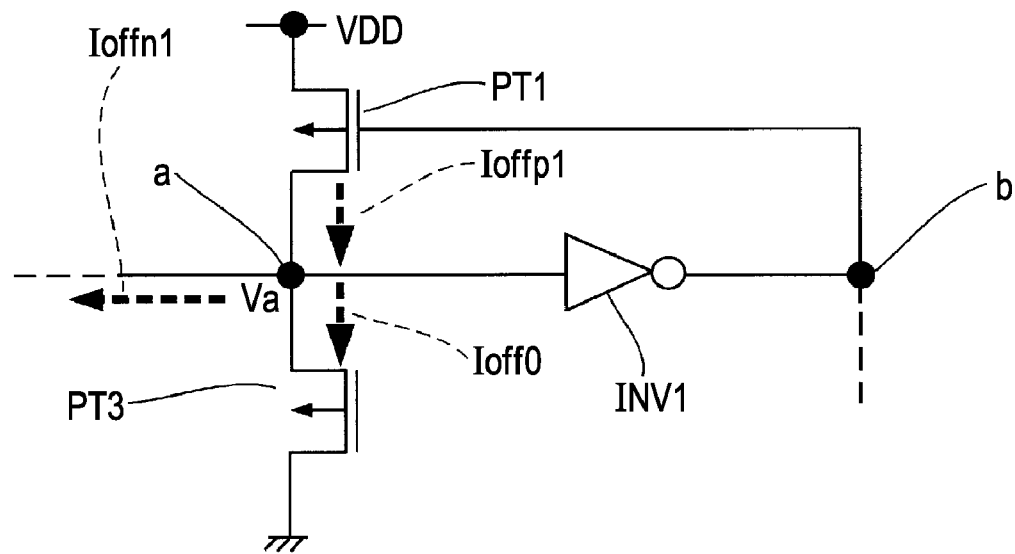

FIGS. 3A and 3B are diagrams showing concrete examples of the countermeasure for the off-leak current of the feedback transistor.

In order to set the countermeasure for the off-leak current of the feedback transistor PT1 thoroughly, for example, the current amount of the off-leak current Ioffp1 of the feedback transistor PT1 is set to be smaller than a sum of the off-leak current Ioffn1 of the pixel transistor NT1 and the off-leak current Ioff0 of the resistor HR (or the leak path transistor PT3 of the normally-off state).

In such a case, the leak current Ioffp1 of the feedback transistor is absorbed by the power source electric potential (GND) or the data DL assuredly, and the voltage of the holding node (point a) does not change in accordance with the off-leak current Ioffp1 of the feedback transistor PT1.

As shown in FIG. 3B, when the leak-path transistor PT3 is configured by a MOS transistor of the same conduction type as that of the feedback transistor PT1, the temperature coefficients of the off-leak currents of the feedback transistor PT1 and the leak-path transistor PT3 become the same. Thus, when the current amount of the off-leak current of one side increases or decreases, the current amount of the off-leak current of the other side increases or decreases in the same manner. Accordingly, even when access to the pixel circuit is not made for a long time, the voltage of the holding node (point a) is stably maintained over a broad temperature range. As a result, a pixel circuit having high reliability is implemented.

Second Embodiment

Figure 4A:
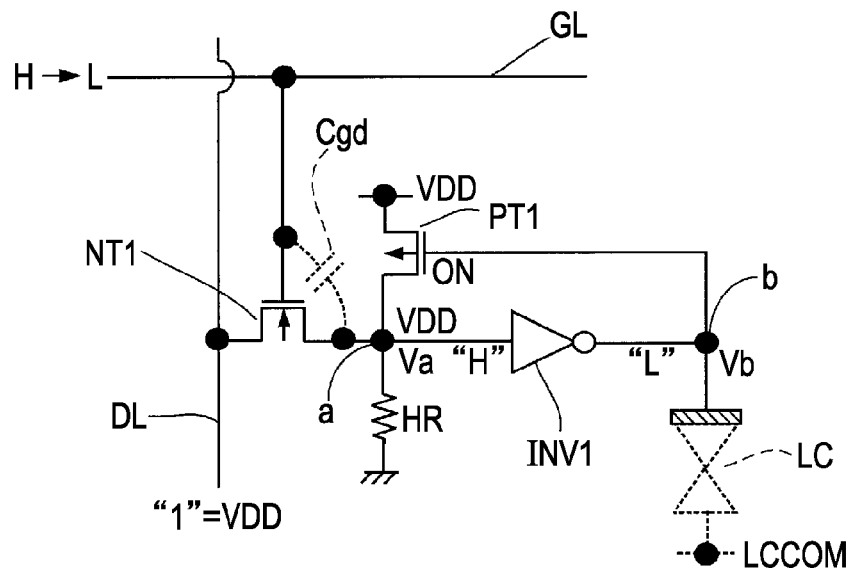
FIGS. 4A to 4C are diagrams for describing adjustment of a threshold voltage of a CMOS inverter as a countermeasure for a change in a writing voltage due to a feed-through voltage of a pixel transistor according to an embodiment of the invention.
Figure 4B:
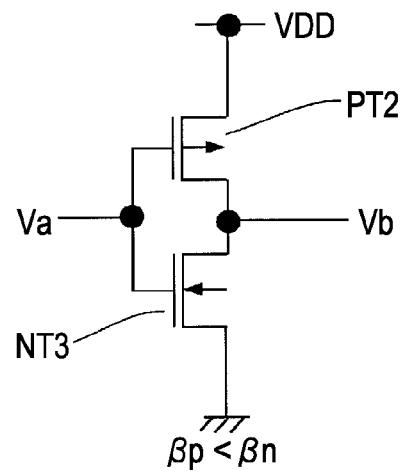
Figure 4C:
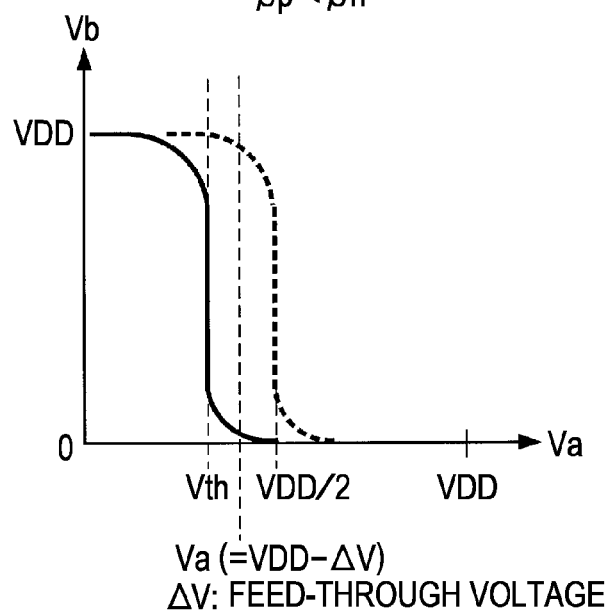

In a second embodiment of the invention, a countermeasure for a change in the writing voltage due to the feed-through voltage of the pixel transistor will be described. FIGS. 4A to 4C are diagrams for describing adjustment of the threshold voltage of the CMOS inverter as a countermeasure for the change in the writing voltage due to the feed-through voltage of the pixel transistor.

In FIG. 4A, it is assumed that "1" is written into the pixel circuit. When a writing operation is completed and the voltage of the scanning line GL changes from H to L, a push-down voltage (feed-through voltage: $-\Delta V$) is generated due to parasitic capacitance Cgd between the gate and drain of the pixel transistor (NMOS transistor) NT1. Accordingly, the electric potential of point "a" becomes (VDD−ΔV). FIG. 4C shows transfer characteristics of the CMOS inverter INV1. As denoted by a dotted line in FIG. 4C, for example, in a case where the threshold voltage is set to VDD/2, when the absolute value of the push-down voltage is large, the CMOS inverter INV1 determines the input to be L, so that the output is H.

Accordingly, as shown in FIGS. 4B and 4C, the threshold voltage Vth of the CMOS inverter INV1 is intentionally shifted. In other words, when the current supplying capability of the PMOS transistor that configures the CMOS inverter INV1 is βp, and the current supplying capability of the NMOS transistor is βn, by setting βp<βn (that is, the channel conductance W/L of the NMOS transistor is designed to be larger than that of the PMOS transistor), the threshold voltage Vth is intentionally set to be lower than VDD/2. Accordingly, the CMOS inverter INV1 is inverted in accordance with a lower voltage. Thus, even when the feed-through occurs, the output voltage of the CMOS inverter INV1 becomes to have the L level. Therefore, mismatch does not occur easily. In FIG. 4C, the threshold voltage Vth (denoted by a solid line in FIG. 4C) of the CMOS inverter is set to be lower than VDD/2 (denoted by a dotted line in FIG. 4C). Accordingly, when the pixel transistor NT1 changes from the ON state to the OFF state in a state that VDD is applied to the data line DL (that is, a state in which data "1" is written), the feed-through voltage (push-down voltage) ΔV is generated. Thus, even when the electric potential of point Va is lowered to be VDD−ΔV, the threshold voltage Vth of the CMOS inverter INV1 is set to be lower than VDD/2, and therefore the output voltage of the inverter INV1 changes to "L". In other words, maintaining correct data can be implemented.

In addition, when the pixel transistor is configured by a PMOS transistor (see FIG. 7), the push-up voltage (+ΔV) is generated due to feed-through. Accordingly, when data "0" is written, the electric potential of point "a" becomes (GND+ΔV). Thus, when the current supplying capability of the PMOS transistor that configures the CMOS inverter INV1 is βp, and the current supplying capability of the NMOS transistor is βn, it is set to be βp>βn. In other words, the channel conductance W/L of the PMOS transistor is designed to be larger than that of the NMOS transistor, and the threshold voltage Vth is intentionally set to be higher than VDD/2. Accordingly, the possibility of mismatch can decrease.

Third Embodiment

Figure 5A:
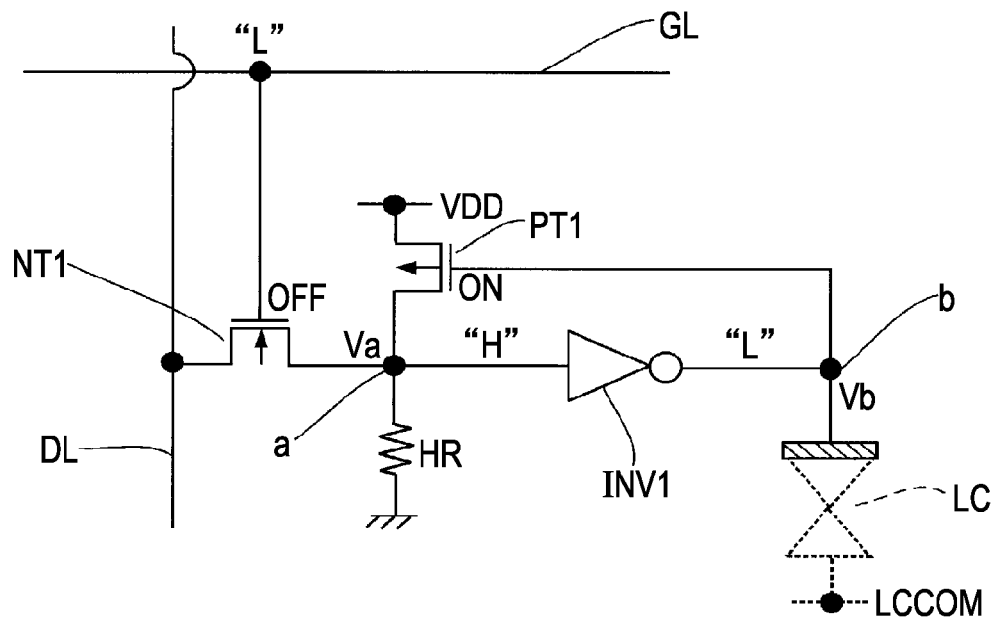
FIGS. 5A and 5B are diagrams showing an example in which the current supplying capability of a pixel transistor is adjusted for a case where "0" is written into a pixel circuit that maintains "1" according to an embodiment of the invention.
Figure 5B:
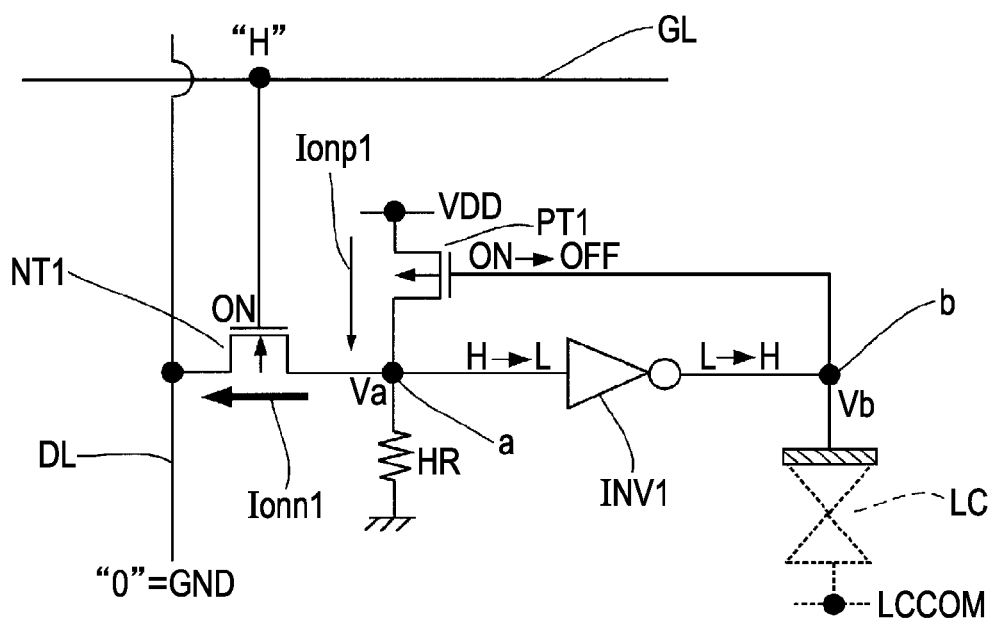

FIGS. 5A and 5B are diagrams showing an improved example for a case where data "0" is written into the pixel circuit that maintains data "1".

As shown in FIG. 5A, data "1" (=VDD) is maintained at the holding node (point a) of the pixel circuit. In this state, as shown in FIG. 5B, a case where data "0" (=GND) is written into the pixel circuit will be considered.

In this case, when the scanning line GL has a selection electric potential (H), the pixel transistor NT1 is turned on. Accordingly, an on-current Ionn1 flows from the holding node (point a) to the data line DL. When the on-current Ionn1 of the pixel transistor NT1 is larger than the on-current Ionp1 of the feedback transistor PT1, the voltage level of the holding node (point a) transits from the H level to the L level. Accordingly, data "0" can be written.

Thus, in order to perform a writing operation assuredly, the characteristics (design values such as the sizes) of the pixel transistor NT1 and the feedback transistor PT1 are optimized. In other words, the on-current c of the pixel transistor NT1 is set to be larger than the on-current Ionp1 of the feedback transistor PT1. In such a case, even when the positive feedback reaction is performed by the flip-flop FF, electric charges at the holding node (point a) of the H level are discharged to the data line DL of the L level in a speedy manner. Accordingly, the electric potential of the holding node (point a) transits from H to L in a speedy manner. Thus, a case where "0" cannot be written into the holding node that maintains "1" does not occur.

Fourth Embodiment

Figure 6:
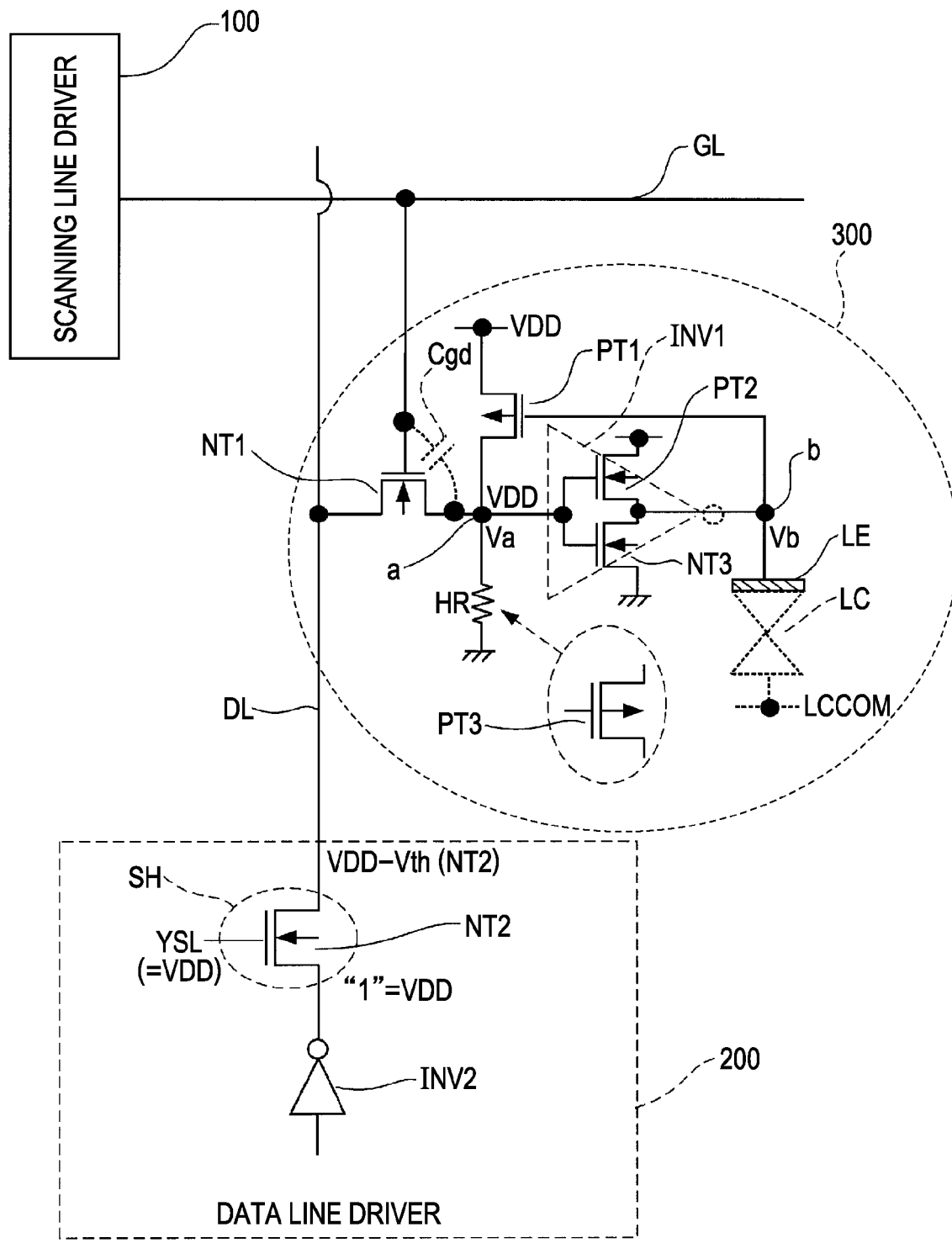
FIG. 6 is a diagram showing an improved example of a data line driver of an electro-optical device according to an embodiment of the invention.

In a fourth embodiment of the invention, a charge or discharge current in the data line driver 200 decreases, and thereby low power consumption is achieved. FIG. 6 is a diagram showing an example of the configuration of an electro-optical device according to an embodiment of the invention.

As shown in FIG. 6, in the output part of the data line driver 200, an NMOS transistor NT2 that configures a sample hold circuit SH is disposed. As the high-level voltage of a sample hold control signal (YSEL) to be supplied to the gate, the high-level power source voltage VDD is used. In such a case, when the threshold voltage of the NMOS transistor NT2 is Vth (NT2), the driving voltage of the H level for the data line DL decreases by Vth (NT2) to be VDD−Vth (NT2). However, as described above, in the pixel circuit, by the positive feedback reaction of the flip-flop FF, the writing voltage increases to VDD, and accordingly, there is no problem. In other words, compared to a case where the driving voltage of the H level for the data line DL is VDD (that is, the sample hold control signal YSEL is set to VDD+Vth (NT2)), the driving amplitude of the data line DL can be decreased by Vth (NT2). By decreasing the driving amplitude of the data line DL, the charge or discharge current of the data line decreases, and thereby low power consumption can be achieved in accordance with the amount of the decrease.

Fifth Embodiment

Figure 7:
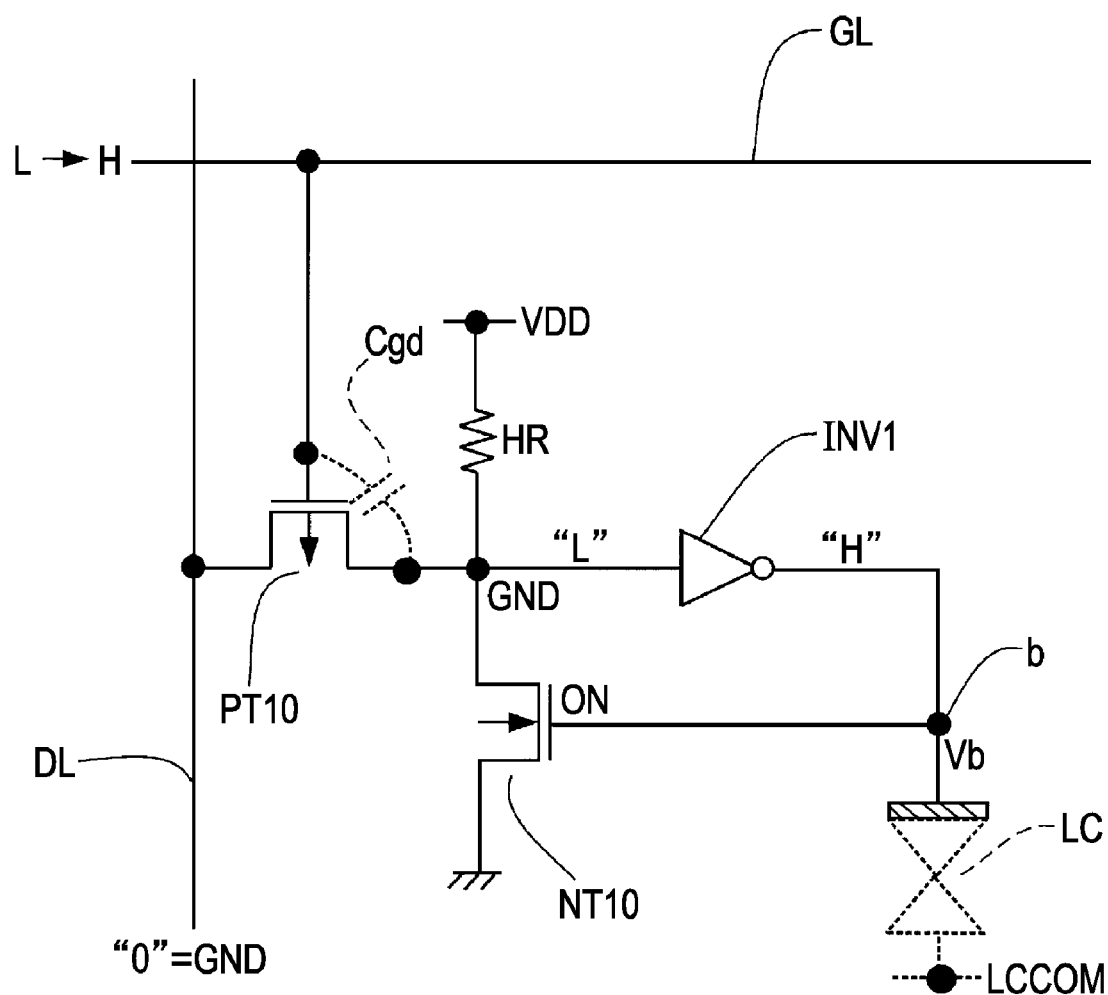
FIG. 7 is a circuit diagram showing another example of a pixel circuit according to an embodiment of the invention.

FIG. 7 is a circuit diagram showing another example of the pixel circuit. According to this embodiment, the conduction type of the used transistor is opposite to that shown in FIG. 1. However, the basic configuration of the pixel circuit is the same as that shown in FIG. 1. In addition, the acquired advantages are the same as those of the above-described embodiment.

Sixth Embodiment

Figure 8:
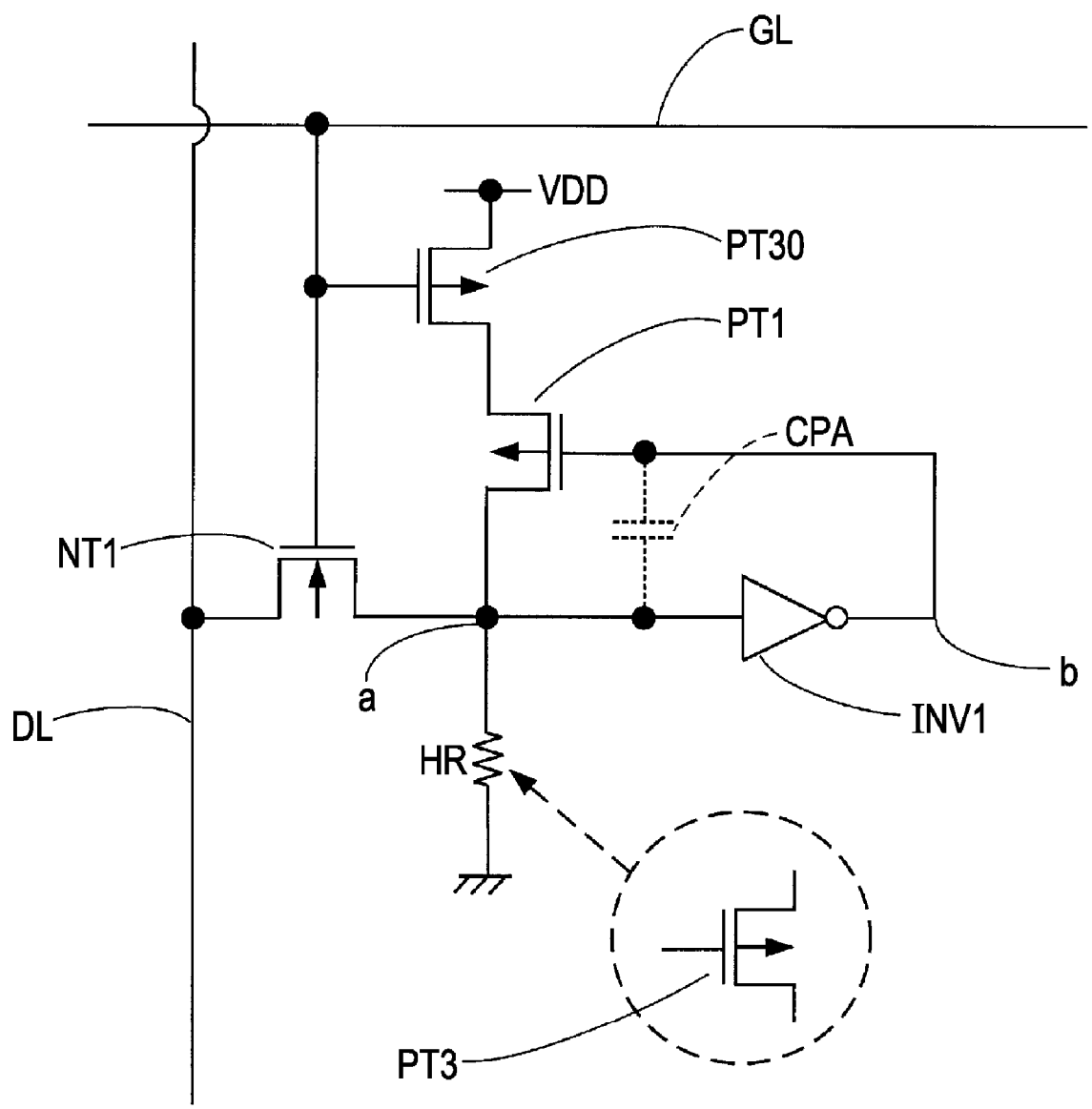
FIG. 8 is a circuit diagram showing still another example of a pixel circuit according to an embodiment of the invention.

FIG. 8 is a circuit diagram showing still another example of the pixel circuit according to a sixth embodiment of the invention. According to this embodiment, a power source voltage supplying transistor PT30 is disposed, and the power source voltage VDD is supplied from the power source voltage supplying transistor PT30 to the feedback transistor PT1.

The power source voltage supplying transistor PT30 has the gate (control node) connected to the scanning line GL, the drain (second node) connected to VDD, and the source connected to the second node of the feedback transistor. The conduction type of the power source voltage supplying transistor PT30 is opposite to that of the pixel transistor NT1. Accordingly, the power source voltage supplying transistor PT30 is turned off in a case where the pixel transistor NT1 is turned on. On the other hand, the power source voltage supplying transistor PT30 is turned on in a case where the pixel transistor NT1 is turned off.

Under the above-described circuit configuration shown in FIGS. 5A and 5B, as shown in FIG. 5B, in a case where the electric potential of the holding node (point a) transits from H to L, right after the scanning line GL has the selection level (H level), a current (Ionp1+Ionn1) momentarily flows from the power source line (VDD) toward the data line DL having the L level through the turned-on feedback transistor PT1. This current becomes a factor for changing the electric potential of the data line and may have influence on the maintained voltages of the other pixel circuits or the like.

Accordingly, according to this embodiment, when the positive feedback reaction of the flip-flop FF is performed, even in a case where the electric potential of the holding node transits from H to L, a large current does not flow in the data line through the feedback transistor.

In other words, as shown in FIG. 8, a configuration in which the power source voltage is supplied from the power source voltage supplying transistor PT30 is employed for the feedback transistor PT1. Under this configuration, when the scanning line GL has the selection level so as to turn on the pixel transistor NT1 of a first conduction type, the power source voltage supplying transistor PT30 of a second conduction type is turned off. Accordingly, the power source voltage VDD is not supplied to the feedback transistor PT1, and therefore a large current does not flow from the node of VDD toward the data line DL through the feedback transistor. As a result, the stability of the circuit operation of the electro-optical device is improved further.

Figure 9A:
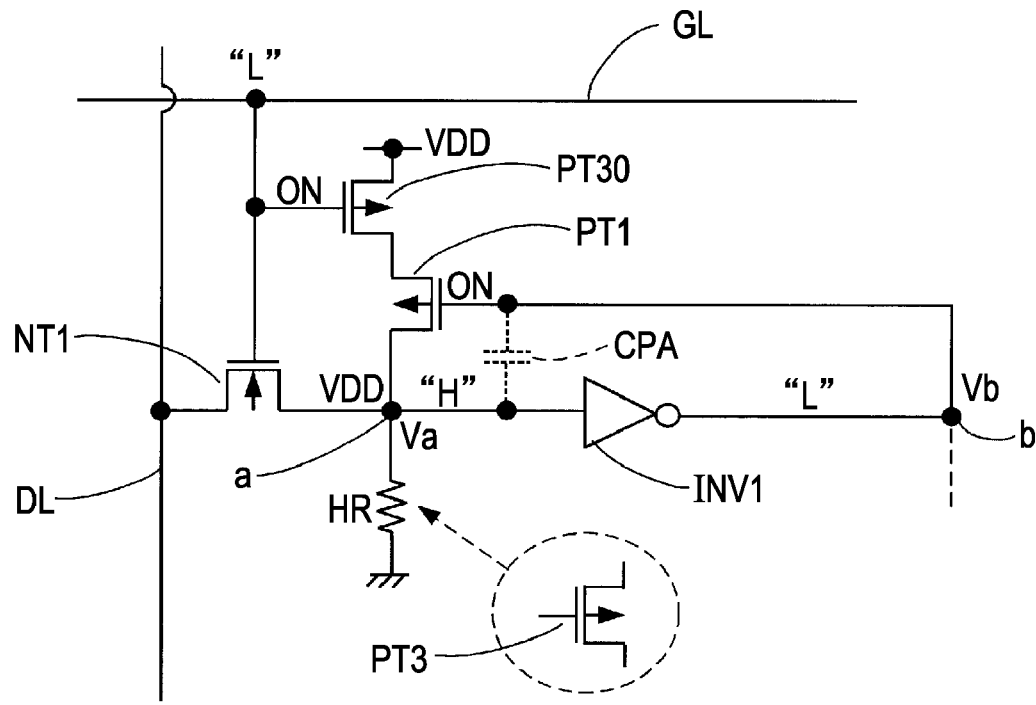
FIGS. 9A and 9B are circuit diagrams showing distinctive operations of the pixel circuit shown in FIG. 8.
Figure 9B:
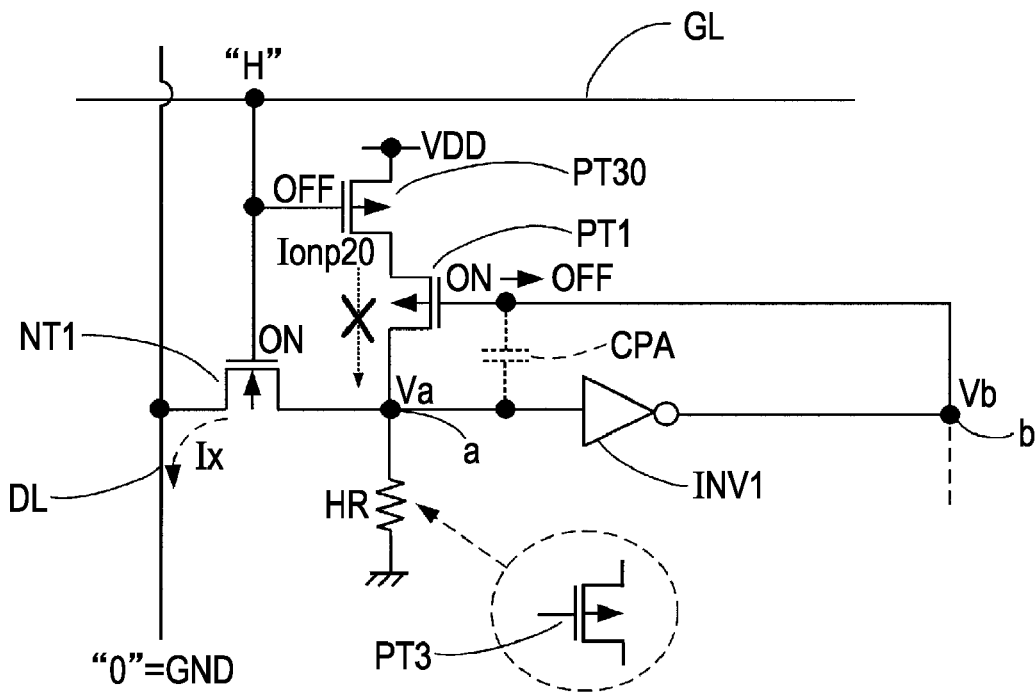

FIGS. 9A and 9B are circuit diagrams showing distinctive operations of the pixel circuit shown in FIG. 8. In FIG. 9A, data "1" is maintained at the holding node (point a) of the pixel circuit. As in FIG. 9B, a case where data "0" is written into this pixel circuit will be considered. In such a case, immediately after the scanning line GL has the selection level (H), the power source voltage supplying transistor PT30 is turned off. Accordingly, right after the scanning line GL is selected, a large current (Ionp20) does not flow toward the data line DL. Meanwhile, the voltage of the holding node (point a) is connected to the data line DL to change from the H level to the L level (at this moment, only a small amount of current Ix flows), and thereby the voltage Vb of the inverted node (point b) changes from L to H. Accordingly, the feedback transistor PT1 transits from the ON state to the OFF state.

Seventh Embodiment

As denoted by a dotted line in FIG. 8 (and FIGS. 9A and 9B), a capacitor CPA may be configured to be connected between the input and output nodes of the inverter INV1 for voltage stabilization. This configuration may be employed to all the above-described embodiments. As a result, a pixel circuit that has strength for minute noises such as coupling noises can be acquired.

Eighth Embodiment

Figure 10:
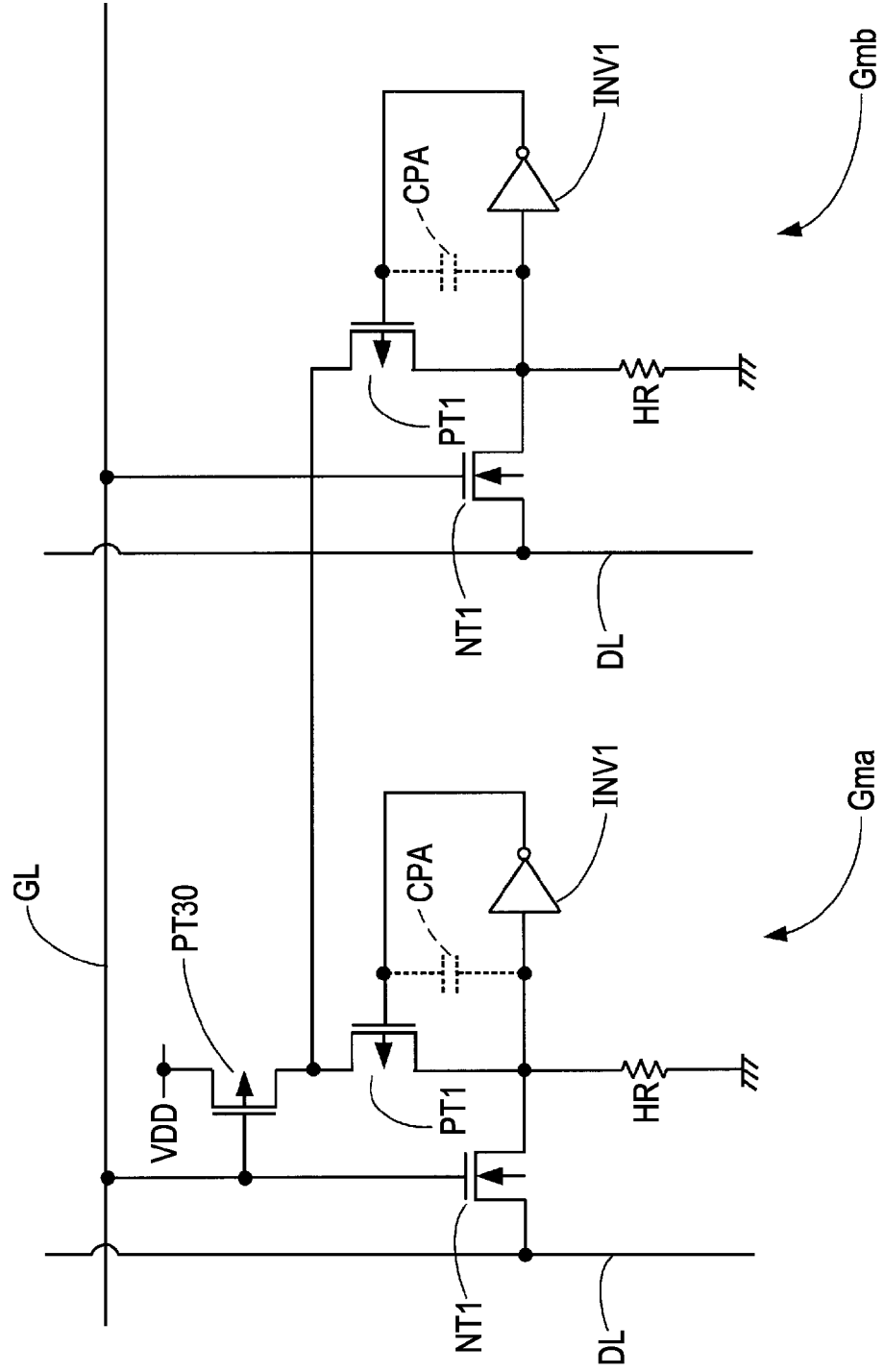
FIG. 10 is a circuit diagram showing the configuration of a modified example according to an embodiment of the invention in which the layout area of a pixel circuit can be decreased.

FIG. 10 is a circuit diagram showing the configuration of a modified example in which the layout area of the pixel circuit can be decreased. As shown in FIG. 10, according to this embodiment, one power source voltage supplying transistor PT30 is commonly used for a plurality of (two in FIG. 10) adjacent pixel circuits. Since the power source voltage supplying transistor PT30 is commonly used for a plurality of pixels, the layout area can be decreased.

Ninth Embodiment

Figure 11:
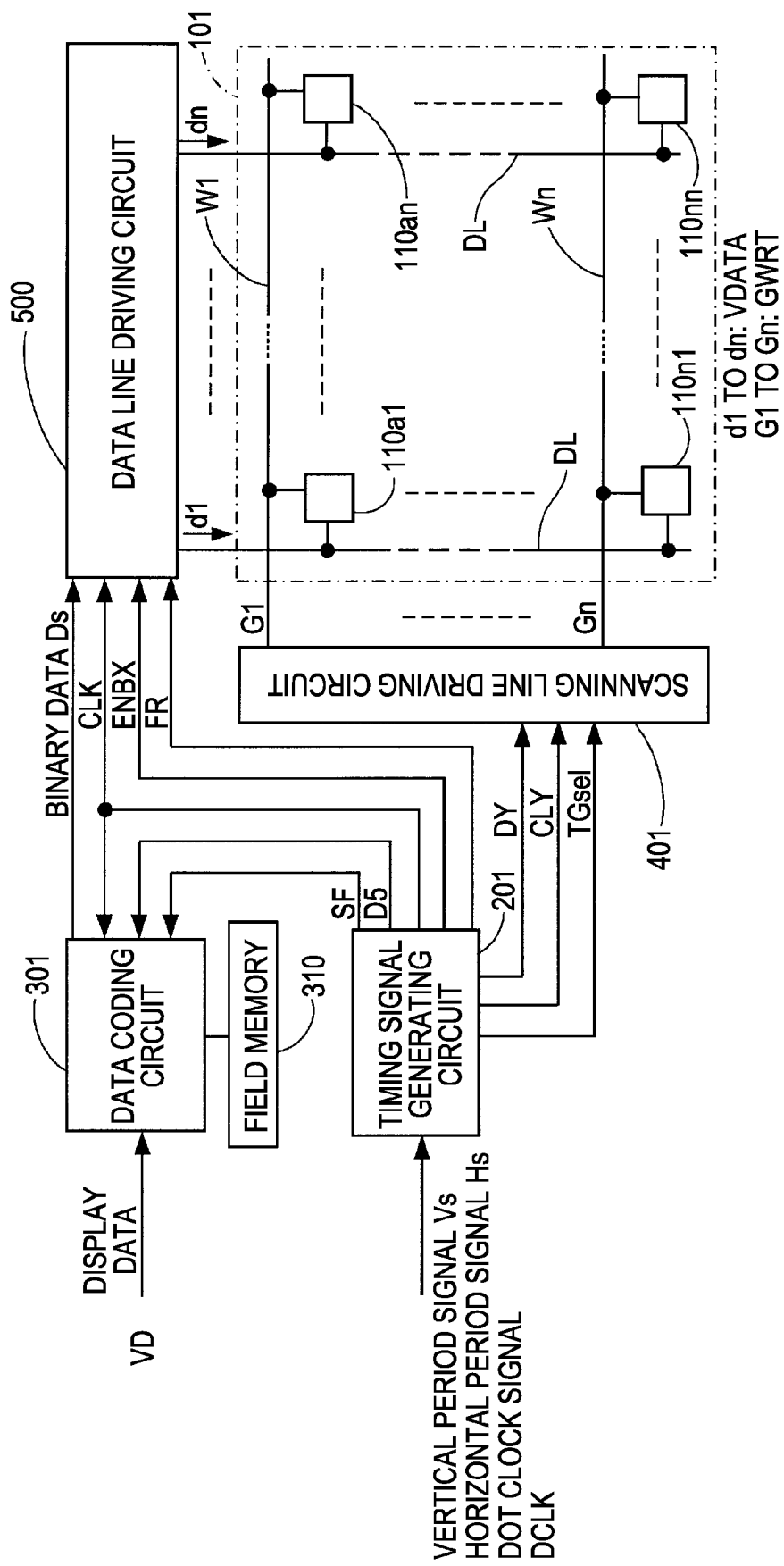
FIG. 11 is a block diagram showing the concrete whole configuration of an example of an electro-optical device (here, a liquid crystal display device) according to an embodiment of the invention.

In this embodiment, the entire configuration and operation of an electro-optical device using a digital driving method will be described. FIG. 11 is a block diagram showing the concrete configuration of the whole electro-optical device (here, a liquid crystal device) according to an embodiment of the invention.

As shown in the figure, the liquid crystal device includes a pixel unit 101 (the above-described pixel circuit according to an embodiment of the invention is used), a timing signal generating circuit 201, a data coding circuit 301, a field memory 310, a scanning line driving circuit 401, and a data line driving circuit 500. In the pixel unit 101, a plurality of the pixel circuits 110 according to an embodiment of the invention is disposed in a matrix shape.

The scanning line driving circuit 401 drives the scanning lines W1 to Wn by using writing pulses G1 to Gn. In addition, the data line driving circuit 500 supplies display voltages (writing voltages) d1 to dn to the pixel circuits 110 through the data lines DL.

Binary data DS that becomes the basis for generating the writing voltages d1 to dn is generated by the data coding circuit 301. The operation timings of each part are controlled based on various timing signals that are output from the timing signal generating circuit 201.

The timing signal generating circuit 201 generates a polarity inversion signal FR, a scanning start pulse DY, a scanning-side transfer clock CLY, a data enable signal ENBX, a data transfer clock CLX, a data transfer start pulse DDS, and a subfield identification signal SF in accordance with timing signals such as a vertical synchronization signal Vs, a horizontal synchronization signal Hs, and a dot clock signal DCLK that are supplied from a higher-level apparatus (not shown). The functions of the above-described signals will be described as below.

The polarity inversion signal FR is a signal of which polarity is inverted for each one field. The scanning start pulse DY is a pulse signal that is initially output in each subfield. By inputting the scanning start pulse DY to the scanning line driving circuit 401, the scanning line driving circuit 401 outputs writing pulses G1 to Gn. The scanning-side transfer clock CLY is a signal that regulates the scanning speed on the scanning side (Y side), and the writing pulses G1 to Gn are transmitted to the scanning lines in synchronization with this transfer clock.

The data enable signal ENBX is used for determining a timing for parallel outputting data, which is stored in a shift register included in the data line driving circuit 500, corresponding to the number of horizontal pixels. The data transfer clock CLX is a clock signal that is used for transferring data to the data line driving circuit 500. The subfield identification signal SF is used for notifying the data coding circuit 301 of the position of the pulse (subfield).

The data coding circuit 301 needs to recognize the position of the subfield within the field in a case where the display data is to be binarized. According to this embodiment, the number of the scanning start pulses (DY) is counted by using the timing signal generating circuit 201 and outputs the result of the counting operation toward the data coding circuit 301 as the subfield identification signal SF. The data coding circuit 301 recognizes the subfield based on the subfield identification signal SF.

The field memory 310 that is connected to the data coding circuit 301, for example, has capacity for storing the display data corresponding to two fields. Here, a first field memory is a memory in which the display data input from the outside is written, and a second field memory is a memory in which the display data input before one field is stored. The field memory 310 is configured such that the data coding circuit 301 accesses the second field memory to read out the display data of each pixel while the display data input from the outside is written into the first field memory. The functions of the first field memory and the second field memory are exchanged for each field.

The above-described pixel circuit according to an embodiment of the invention is a new highly reliable pixel circuit, which is appropriate for a digital driving type, having a minimum number of elements and capable of performing high-definition image display. Accordingly, by using the pixel circuit, an electro-optical device of a digital driving type that is miniaturized and light-weighted, has low power consumption, and is capable of performing high-definition display is implemented.

Tenth Embodiment

In a tenth embodiment of the invention, an electronic apparatus using the electro-optical device according to an embodiment of the invention will be described. In this embodiment, as an example, a cellular phone will be described.

Figure 12:
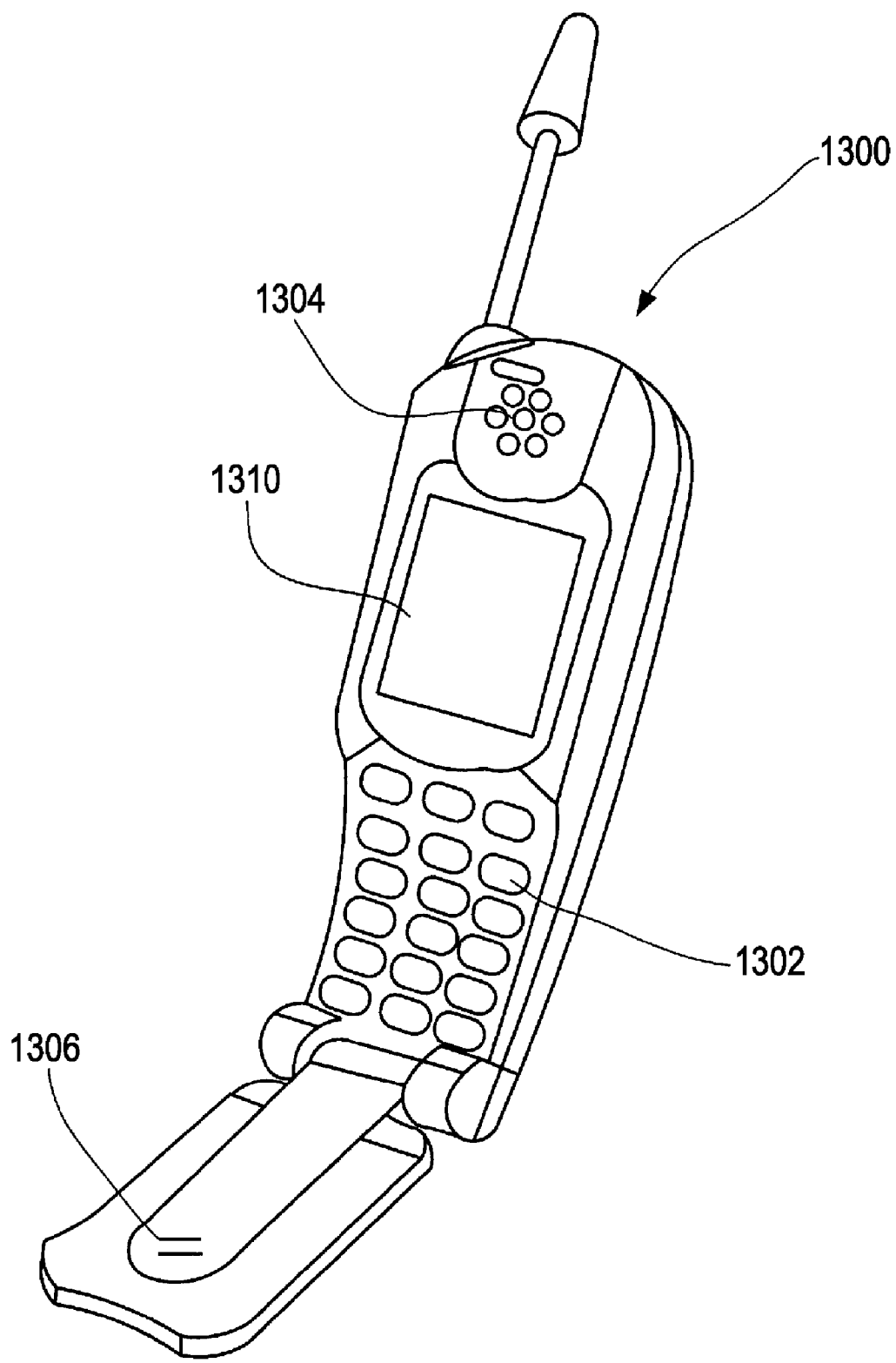
FIG. 12 is a diagram showing the appearance of an example of an electronic apparatus in which an electro-optical device according to an embodiment of the invention is mounted.

FIG. 12 is a perspective view showing the entire configuration of the cellular phone. The cellular phone 1300 is configured by a casing body 1306, an operation unit 1302 in which a plurality of operation buttons is installed, and a display unit 1310 that displays an image, a moving picture, a text, or the like, as its major bodies. In the display unit 1310, the electro-optical device according to the above-described embodiment is mounted.

As described above, the electro-optical device according to an embodiment of the invention has a simplified configuration and has advantages of miniaturization, light-weight, low power consumption, low cost, and high-definition display. Accordingly, the cellular phone 1300 in which the electro-optical device is mounted has the same advantages, similarly.

As described above, according to some of the embodiments of the invention, for example, a pixel circuit that has a small number of elements, occupies a small area, can write data with high accuracy and maintain the written voltage, has high reliability, and is appropriate for a digital driving type can be implemented. In addition, an electro-optical device of a digital driving type that is miniaturized, light-weighted, has low power consumption and lost cost, and can perform high-definition display is implemented. In addition, an electronic apparatus having the same advantages as described above is implemented.

The embodiments of the invention have been described in detail. However, it will be easily understood by those of ordinary skill in the art that various changes in form may be made therein without departing from new matters and advantages of the invention. Accordingly, such modified examples belong to the scope of the invention. For example, the invention may be implemented as a pixel circuit (for example, a pixel circuit of an organic EL display device) of a display device other than the liquid crystal display device.

In the electro-optical device according to an embodiment of the invention, for example, high-temperature polysilicon, low-temperature polysilicon, amorphous silicon, single-crystal silicon, or the like may be used as a substrate.

The entire disclosure of Japanese Patent Application No: 2008-043133, filed Feb. 25, 2008 is expressly incorporated by reference herein.

What is claimed is:

1. A pixel circuit that is disposed in correspondence with an intersection of a scanning line and a data line, the pixel circuit comprising:
   a pixel electrode;
   a pixel transistor of a first conduction type that has a control node connected to the scanning line, a first node to which the data line is connected, and a second node; and
   a flip-flop that is disposed between the second node of the pixel transistor and the pixel electrode,
   wherein the flip-flop has an inverter having an input node connected to the second node of the pixel transistor and an output node connected to the pixel electrode and a feedback transistor of a second conduction type, which is a conduction type opposite to the first conduction type, that is controlled to be turned on or off in accordance with an output of the inverter and supplies a high-level power source voltage or a low-level power source voltage to a common connection point of the second node of the pixel transistor and the input node of the inverter, in the ON state.

2. The pixel circuit according to claim 1,
   wherein the pixel transistor is an MOS transistor of the first conduction type,
   wherein the inverter is a CMOS inverter that operates between the high-level power source voltage and the low-level power source voltage,
   wherein the feedback transistor is an MOS transistor of the second conduction type that has a control node, a first node, and a second node,
   wherein the control node of the feedback transistor is connected to a common connection point of an output node of the CMOS inverter and the pixel electrode,
   wherein the high-level power source voltage or the low-level power source voltage is applied to the first node of the feedback transistor, and
   wherein the second node of the feedback transistor is connected to a common connection point of the second node of the pixel transistor and an input node of the CMOS inverter.

3. The pixel circuit according to claim 1, further comprising a resistor or a MOS transistor of a normally-off state that is connected between the common connection point of the second node of the pixel transistor and the input node of the inverter and a high-level power source electric potential node or a low-level power source electric potential node.

4. The pixel circuit according to claim 3, wherein the MOS transistor of the normally-off state is an MOS transistor of the second conduction type that has a control node connected to the high-level power source electric potential node, a first node connected to the high-level power source electric potential node or the low-level power source electric potential node, and a second node connected to the common connection point of the second node of the pixel transistor and the input node of the inverter.

5. The pixel circuit according to claim 3, wherein the current amount of a leak current at a time when the feedback transistor is turned off is set to be smaller than the current amount of a sum of a leak current at a time when the pixel transistor is turned off and a leak current of the resistor or the MOS transistor of the normally-off state.

6. The pixel circuit according to claim 2,
wherein, when the MOS transistor of the first conduction type that configures the pixel transistor is an NMOS transistor, the current supplying capability of the NMOS transistor that configures the CMOS inverter is set to be larger than that of the PMOS transistor that configures the CMOS inverter, and
wherein, when the MOS transistor of the first conduction type that configures the pixel transistor is a PMOS transistor, the current supplying capability of the PMOS transistor that configures the CMOS inverter is set to be larger than that of the NMOS transistor that configures the CMOS inverter.

7. The pixel circuit according to claim 1, wherein an ON current of the pixel transistor is set to be larger than that of the feedback transistor.

8. The pixel circuit according to claim 1, further comprising a power source voltage supplying transistor of the second conduction type that supplies the high-level power source voltage or the low-level power source voltage to the feedback transistor,
wherein a control node of the power source voltage supplying transistor is connected to the scanning line, and a first node of the power source voltage supplying transistor is connected to a high-level power source electric potential node or a low-level power source electric potential node, and
wherein the high-level power source voltage or the low-level power source voltage is supplied from a second node of the power source voltage supplying transistor to the feedback transistor in a case where the power source voltage supplying transistor is in the ON state.

9. The pixel circuit according to claim 1, wherein a capacitor is connected between the input and output nodes of the inverter.

10. The pixel circuit according to claim 8, wherein the power source voltage supplying transistor is commonly used by a plurality of adjacent pixel circuits.

11. An electro-optical device of a digital driving type having the pixel circuit according to claim 1.

12. The electro-optical device of the digital driving type according to claim 11 further comprising:
a plurality of scanning lines;
a plurality of data lines;
the pixel circuit that is disposed in correspondence with each intersection of the plurality of scanning lines and the plurality of data lines;
a scanning line driver that drives the plurality of scanning lines; and
a data line driver that drives the plurality of data lines,
wherein the data line driver has a sample hold switch that is configured by an NMOS transistor or a PMOS transistor for sampling and holding binary voltages supplied to the plurality of data lines, and
wherein a binary voltage level of a control signal for controlling the sample hold switch to be turned on or off is set to a low-level power source electric potential or a high-level power source electric potential.

13. An electronic apparatus in which the electro-optical device of the digital driving type according to claim 11 is mounted.

* * * * *